US011487527B1

(12) United States Patent
Nos

(10) Patent No.: US 11,487,527 B1
(45) Date of Patent: Nov. 1, 2022

(54) CROSS FEATURE TOGGLES

(71) Applicant: SAP SE, Walldorf (DE)

(72) Inventor: Kathrin Nos, Nubloch (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/357,242

(22) Filed: Jun. 24, 2021

(51) Int. Cl.
*G06F 9/44* (2018.01)
*G06F 8/65* (2018.01)
*G06F 11/36* (2006.01)
*G06F 9/48* (2006.01)

(52) U.S. Cl.
CPC .............. *G06F 8/65* (2013.01); *G06F 9/4881* (2013.01); *G06F 11/3636* (2013.01)

(58) Field of Classification Search
CPC ....... G06F 8/65; G06F 9/4881; G06F 11/3636
See application file for complete search history.

(56) References Cited

U.S. PATENT DOCUMENTS

2018/0088929 A1* 3/2018 Eberlein et al. .......... G06F 8/65

* cited by examiner

*Primary Examiner* — Chuck O Kendall
(74) *Attorney, Agent, or Firm* — Buckley, Maschoff & Talwalkar LLC

(57) ABSTRACT

According to some embodiments, a system and method are provided comprising two or more components; a cross-feature toggle module; a cross-feature toggle processor in communication with the cross-feature toggle module and operative to execute processor-executable process steps to cause the system to: receive a request to execute an application; determine a new feature element is present; determine a cross-feature toggle is present, wherein the feature toggle includes an active state and an inactive state; determine whether the cross-feature toggle is in an active state for each of a respective two or more components; in a case the cross-feature toggle is in the active state for each of the two or more components, execute the application with the new feature element; and in a case the cross-feature toggle is in the active state for less than all of the two or more components, execute the application without the new feature element. Numerous other aspects are provided.

20 Claims, 6 Drawing Sheets

CROSS FEATURE TOGGLES

BACKGROUND

A feature toggle is a technique in software development that attempts to provide an alternative to maintaining multiple branches in source code (known as feature branches), such that a single software feature can be tested even before it is completed and ready for release. A feature toggle is used to hide, enable or disable the feature during runtime. For example, during the development process, a developer may enable the feature for testing and disable it for other users. Additionally, feature toggles allow developers to release a version of a product that has unfinished features. These unfinished features are hidden (toggled) so that they do not appear in the user interface. This may allow many small incremental versions of software to be delivered without the cost of constant branching and merging.

Feature toggles are only used with one computing component ("component"). For example, in a Java development, the product consists of all classes, includes, etc. with the source code of this component. In this case, the feature toggle uses a direct approach: IF <feature toggle="ON"> THEN <use new functionality> ELSE <keep using old coding and neglect new functionality>. However, in more complex situations, the software may operate with multiple components that depend on each other, and therefore a new feature may require modifications in multiple components. As new features are developed in different systems/layers for the multiple components, it may take time before the new feature is enabled in the multiple components. As such, the development of the new feature in a first component may be ready but cannot be tested until the new feature in a second component is ready, as the first component relies on data from the second component. Therefore, the first component is not complete until the second component is ready and the first and second components are both tested. Further, with conventional feature toggles, only feature toggles of the new feature in one of the components can be switched on and off. For developers, this may mean having to manually activate feature toggles for testing in both components. However, until all of the changes in the system (which includes the multiple components) are properly tested, errors may occur due to missing parts from any of the components.

Systems and methods are desired which support the introduction of a new feature in multiple dependent components.

DETAILED DESCRIPTION

Figure 1:
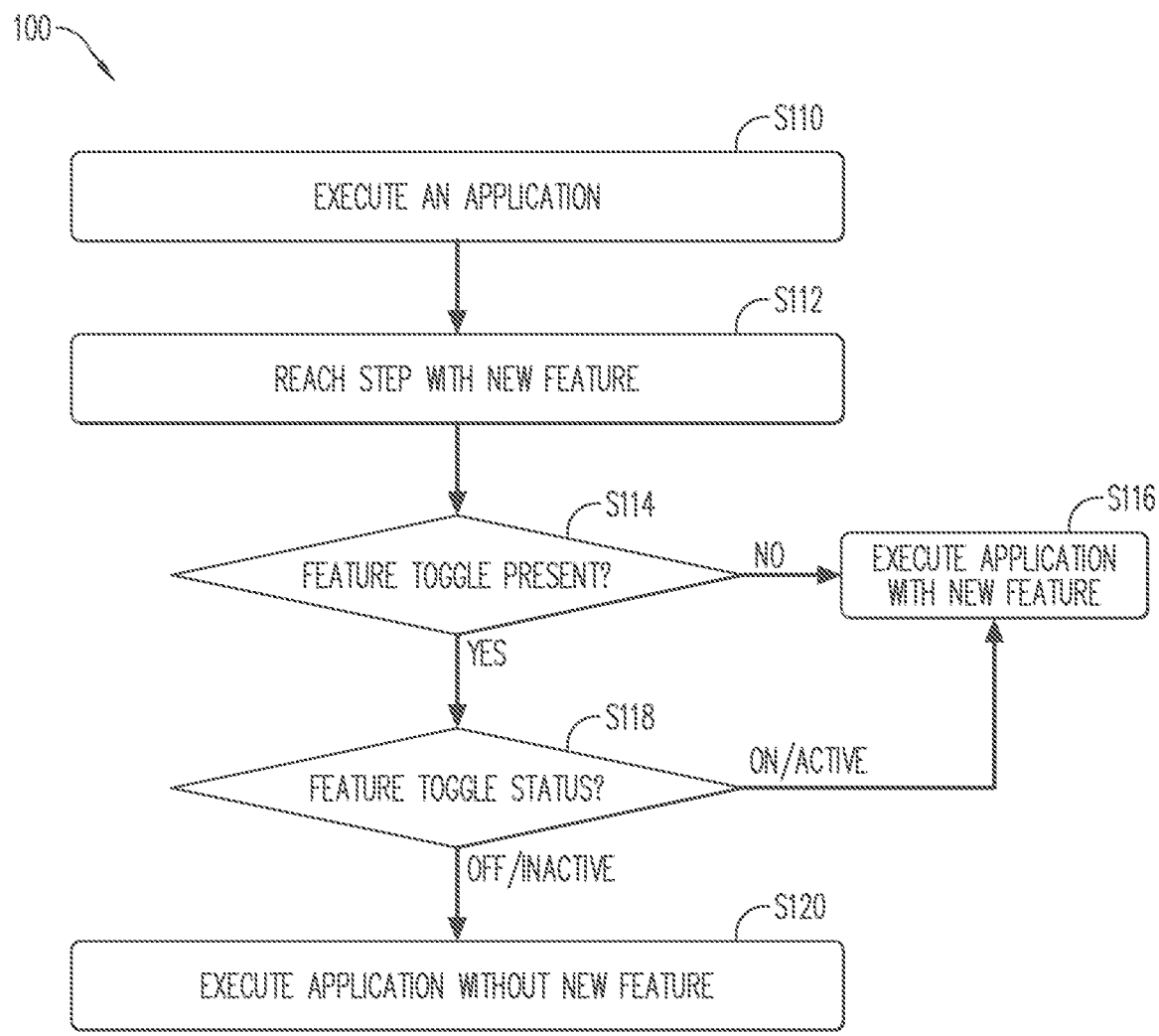
FIG. 1 is a flow diagram as conventionally used.

The following description is provided to enable any person in the art to make and use the described embodiments and sets forth the best mode contemplated for carrying out some embodiments. Various modifications, however, will remain readily apparent to those in the art.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

As used herein, the term "toggle" may be used to describe the process of switching back and forth between settings or between programs. For example, a user may toggle between a software program and a software calculator, or a feature may toggle between being "ON/ACTIVE" and "OFF/INACTIVE". As also used herein, the term "toggle" may also be used to describe the actual controller that enables the user to switch between settings/programs.

An application system may include two or more components (e.g., a first component ("Component A") and a second component ("Component B")). The components may be parts of an application and may be stored in different layers for the software. As commonly understood, modules or components with similar functionalities are organized into horizontal layers, therefore, each layer performs a specific role within the application. The layered architecture style does not define how many layers are in the application. However, some examples of layers include, but are not limited to: a presentation/UI layer (a.k.a. view layer, presentation tier in multitier architecture); a logic layer and a data layer. The presentation layer is the top-most layer and the main function of this layer is to translate tasks and results into something a user can understand. The logic layer handles the user request. The logic layer is used to coordinate the application, process commands, make logical decisions and evaluations, and perform calculations based on the user request. The logic layer may also move and process data between the presentation layer and the data layer. The data layer may control the actual database and file system, to perform the database writing. In the data layer, the information/data is stored and retrieved from a database or file system. The information is then passed back to the logic layer for processing and then eventually back to the user via the presentation/UI layer. Other layers may be used.

There may be instances where the first component may call the second component for functionality. As a non-exhaustive example, a developer may be writing an application with a particular development language, and this may occur in the first layer/component ("Component A"). However, some of the functionality (e.g., checking passwords to prevent tampering) performed by the application may occur via a kernel, which may be a second layer/component ("Component B").

With software development, tests may be executed in a test environment to determine whether data may be transported from one layer/component/system to another layer/component/system. As such, when a developer introduces a new feature/functionality that includes the interaction of both layers, in a conventional scenario, before each layer may be tested, both layers must be ready for testing. The reason for this is that in a case the first layer/component calls the second layer/component for data and the data is not available, the user may receive a run-time error, etc. In a production environment, it may be desirable to avoid a situation where an error occurs because two different versions of the functionality is working across layers, resulting in a situation where one layer already is on the new version, but the other is not. It is noted that a runtime error in the test environment is less disruptive than a runtime error in a production environment. Consequently, in a case the two example components A and B are not both present in the production system (which may occur when the delivery of the components is independent), the described runtime error may occur. It is desirable to have a defined set of versions across all respective layers in the production environment. For example, if a scenario includes Layer A, Version 3 and Layer B, Version X, both Layer A and Layer B may be taken into the production environment when for both Layers, the respective versions are complete, and tests have been completed and are successful. As such, the production environment may not receive updates to the participating components until both layers are available.

To address this situation, a feature toggle framework may be used. With a feature toggle framework, a developer may enclose a new feature/functionality within a feature toggle in each component where the feature will be executed. In this way, the developer may set the toggle status to "OFF/INACTIVE" and continue to work on the functionality of the feature in each system/layer/component without a production environment being aware of the feature. Then, when the functionality for the new feature is complete in each system/layer/component, a production environment may make the feature available by manually or automatically changing the status of each to "ON/ACTIVE". For example, the decision to make the features available may be made by a customer (e.g., some customers may want the features while others do not), a hosting company (in a cloud scenario), or in some cases by a user (e.g., user may decide to use an "old" look or a "new" look for a search engine). With respect to the hosting company, for example, a cloud company may use feature toggles in a "canary" fashion, meaning they will enable it for some users, observe how it works, resolve any upcoming problems (and avoid a large number of users being affected by these problems), and later activate it at a large scale.

Figure 2:
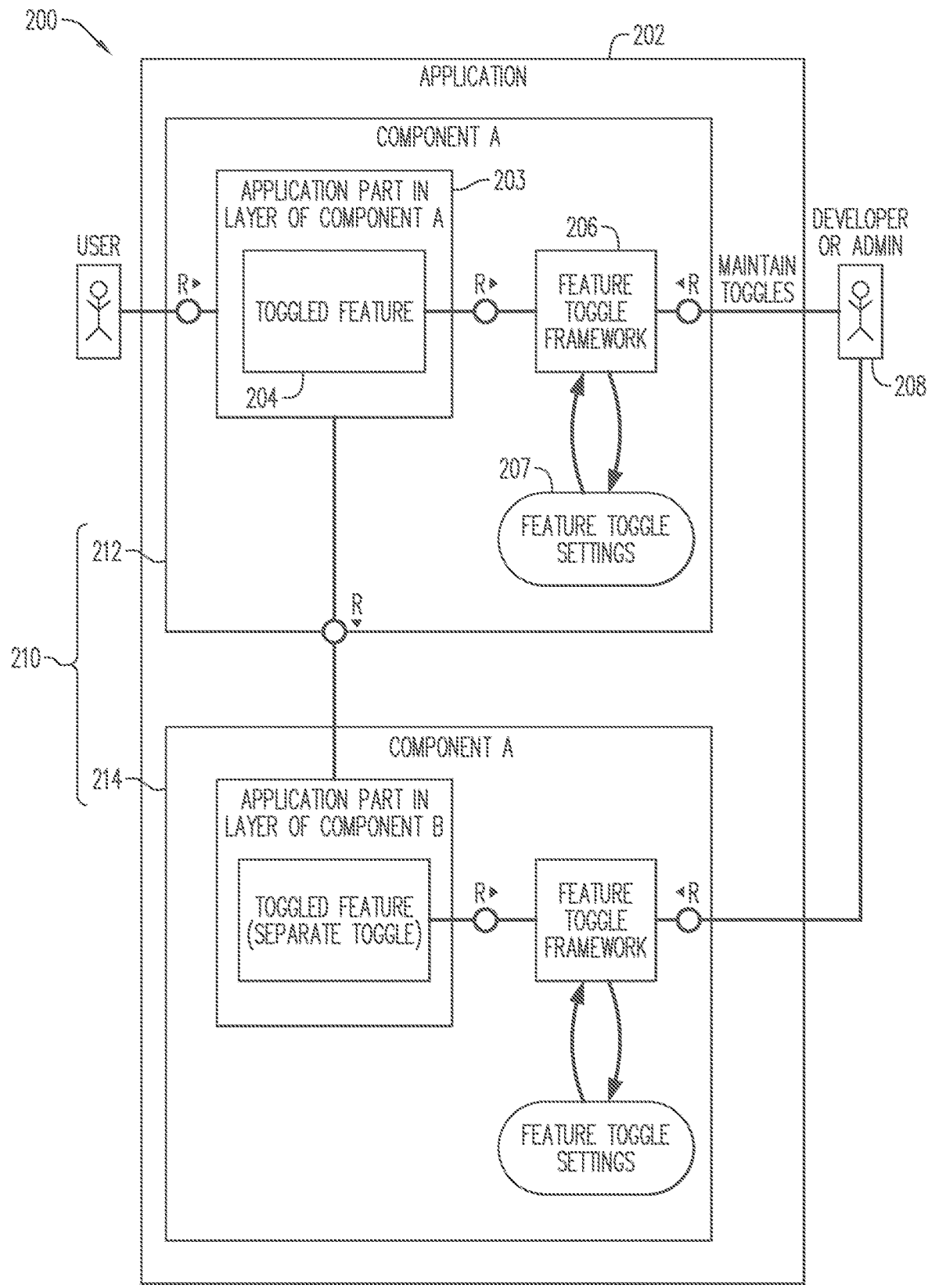
FIG. 2 is a block diagram of a conventional system architecture.

FIGS. 1 and 2 provide a conventional method 100 and system 200, respectively for using a conventional feature toggle. At S110, an application 202 is executed. The application 202 includes a new feature/functionality 204 for each of a respective application part in a layer of a given component 203, and a feature toggle framework ("feature toggle") 206. The executing application reaches the step with the new feature/functionality 204 at S112. Then at S114, the system 200 determines whether the feature toggle 206 is present. In a case the feature toggle 206 is not present, the process proceeds to S116, and the application continues executing using the new feature/functionality. In a case it is determined at S114 that the feature toggle 206 is present, the process 100 continues to S118 to determine whether the feature toggle 206 has an "ON/ACTIVE" status or an "OFF/INACTIVE" status. When the application is executed, the new feature will only be executed in a case the feature toggle 206 is activated. The activation of the feature toggle 206 may be performed by a developer 208 in a test system so that the developer 208 may explicitly test the new functionality/feature ("toggled feature") 204. It is noted that the activation of the toggle in a production system may be performed by an administrator (or a hosting agent or other agent in a similar position with responsibility for the proper operation of the production system). In a case it is determined at S118 that the feature toggle has an "OFF/INACTIVE" status, the process 100 proceeds to S120 and the application continues execution without using the new feature/functionality 204. In a case it is determined at S118 that the feature toggle has an "ON/ACTIVE" status, the process proceeds to S116, and the application continues executing using the new feature/functionality. In general, conventional feature toggle usage is via an "if" clause in programming (i.e., IF the feature toggle has a status of "on," use the new feature, otherwise proceed without the feature).

FIG. 2 provides a non-exhaustive example of a conventional application system 200 that may execute the method 100, described above with respect to FIG. 1. The application system 200 includes an application 402 having two components 210—a first component ("Component A") 212 and a second component 214 ("Component B"). It is noted that while two components are showed herein, more than two components may be associated with a same application. Each of the components 210 may have a feature toggle framework 206. The feature toggle framework 206 may include two or more feature toggle settings 207—"ON/ACTIVE" and "OFF/INACTIVE", which may be included by a developer 208 and may be set by the developer 208 or other suitable party.

In more complex situations, software may work with different components. As a non-exhaustive example, business logic and parts of the technology for a particular programming language may be in one layer with its own source code repository and transport management, while the kernel (which may be written in C/C++ with a separate repository and transport management) is in a different layer and contains central logic that is not directly visible and available to application developers. A developer may develop a new feature/functionality that requires modifications in both components/layers. The feature may be developed in different systems, and to bring together the modifications to both may take some time. Until all changes in a same system are properly tested, errors may occur due to missing parts from either of the two components.

With the best practices of feature toggle frameworks known today, only the new features in one of the components may be switched on and off. While further grouping of feature toggles may occur, such as with feature toggle groups, these are within a single component—not across components. Today, to use a new feature in two or more components, the developer may need to manually activate the feature for testing. The problem with manual activation is that it is error prone and may result in runtime-errors. As a non-exhaustive example, consider a case where one toggle is activated in component A. Then the coding is executed where the new functionality is called in component B. In the case the new functionality is not present there (or the toggle is not activated too), a runtime error occurs. Error sources may include but are not limited to: manual maintenance of toggles by a developer (or other entity that may switch the toggle on and off), transports are reaching a system, introducing changed coding, etc. As such, with the conventional toggle framework, a new feature/functionality may only be used by any of the components when it is available in all of the components. The reason for this is that since only one primary component may use the toggle feature, any other secondary component may need to have the new feature/ functionality toggled to "ON/ACTIVE" before that toggle feature is implemented in the primary component. Due to both manual steps for toggling, and to receiving transports/upgrades of the components in independent schedules (e.g., A and B may receive transports in totally different times, e.g., one of them daily and one of them weekly, etc.), a situation may occur where both the coding for the components and the toggle status do not fit to each other and cause runtime problems.

Embodiments provide a cross-feature toggle that may allow each component to use a feature toggle within their respective components. The cross-feature toggle may provide for the new feature/functionality requiring development in different components to be toggled in each component. In one or more embodiments, the new feature is a new function for the application. As the new functionality is available in each participating component, the feature toggle in each individual component may be switched to "ON/ACTIVE." When all of the participating components have a feature toggle with a status of "ON/ACTIVE," the new feature/functionality may be used by the application. Until then, each component may switch on their feature toggle individually, without affecting the other components.

In embodiments, at runtime, when a user executes an application with new feature/functionality, the cross-feature toggle is evaluated at the leading component and all the components participating in the application ("participating components"), such that a system-wide evaluation is performed. The user will experience the application with the new feature/functionality in place only in a case that all leading and participating components have an "ON/ACTIVE" cross-feature toggle status. If less than all of the components have an "ON/ACTIVE" cross-feature toggle status, all participating components will run the application without the new feature.

In embodiments, each component may include an added parameter on top of their respective feature toggle that indicates and identifies the other components that may participate in the cross-feature toggle making the toggle a "cross-feature toggle." As a non-exhaustive example, the identification may be via an identifier that is the same in all components. Then the component may be looked-up in the feature toggle framework to determine which other components have that same identifier. For example, Component A developers finish the development of a new feature for a software application ("application"). The developers activate a cross-feature toggle for Component A and include data that Component B participates in the cross-feature toggle. Then, when the application is executed and the logic reaches the new feature of Component A, the feature toggle framework is called by Component A. The feature toggle framework may then determine the status of each participating component (e.g., Component B), by calling all participating components and requesting a status (e.g., to determine whether the cross-feature toggle of Component B has a status of "ON/ACTIVE" (signifying that component B is ready to be executed with the new feature)). The feature toggle framework may determine whether or not to execute the new feature based on the combination of all components' toggle status, which is evaluated together. In a case the cross-feature toggle for Component B has a status of "ON/ACTIVE", the new feature may be executed for Component A. In a case the new feature is not yet ready (and as such, the cross-feature toggle has an "OFF/INACTIVE" status or it is not present yet which is treated in the same way as the "OFF/INACTIVE" status and may return a status of "OFF/INACTIVE", the program logic in Component A may proceed with the old logic as if the cross-feature toggle in Component A had an "OFF/INACTIVE" status. One of the components (e.g., Component A and Component B) may still operate in a production environment (after its new feature and its toggle are available) with the new feature/functionality unavailable to a user as the cross-feature toggle acts as if the status is "OFF/INACTIVE" while other components are still being developed, even though the new feature/functionality has not been tested in all of the components. The ready component may operate independently of the other components until the other components are available for testing. In this way, the multiple components may inform each other of their status via the cross-feature toggle, but may still be able to be developed independently of each other.

Embodiments may provide for any automatic tests to either completely use the old functionality for the application or completely use the new functionality. Any errors (be it functional errors, runtime errors, or others) that may usually happen due to a mismatch (e.g., one component has the new feature while the transport of the new feature in the other component is still pending) will not happen. It is desirable to avoid mismatch, as such errors may seriously disrupt systems and may lead to situations where the errors that happen are preventing other functionality's tests from working property (e.g., because other tests also fail).

Figure 3:
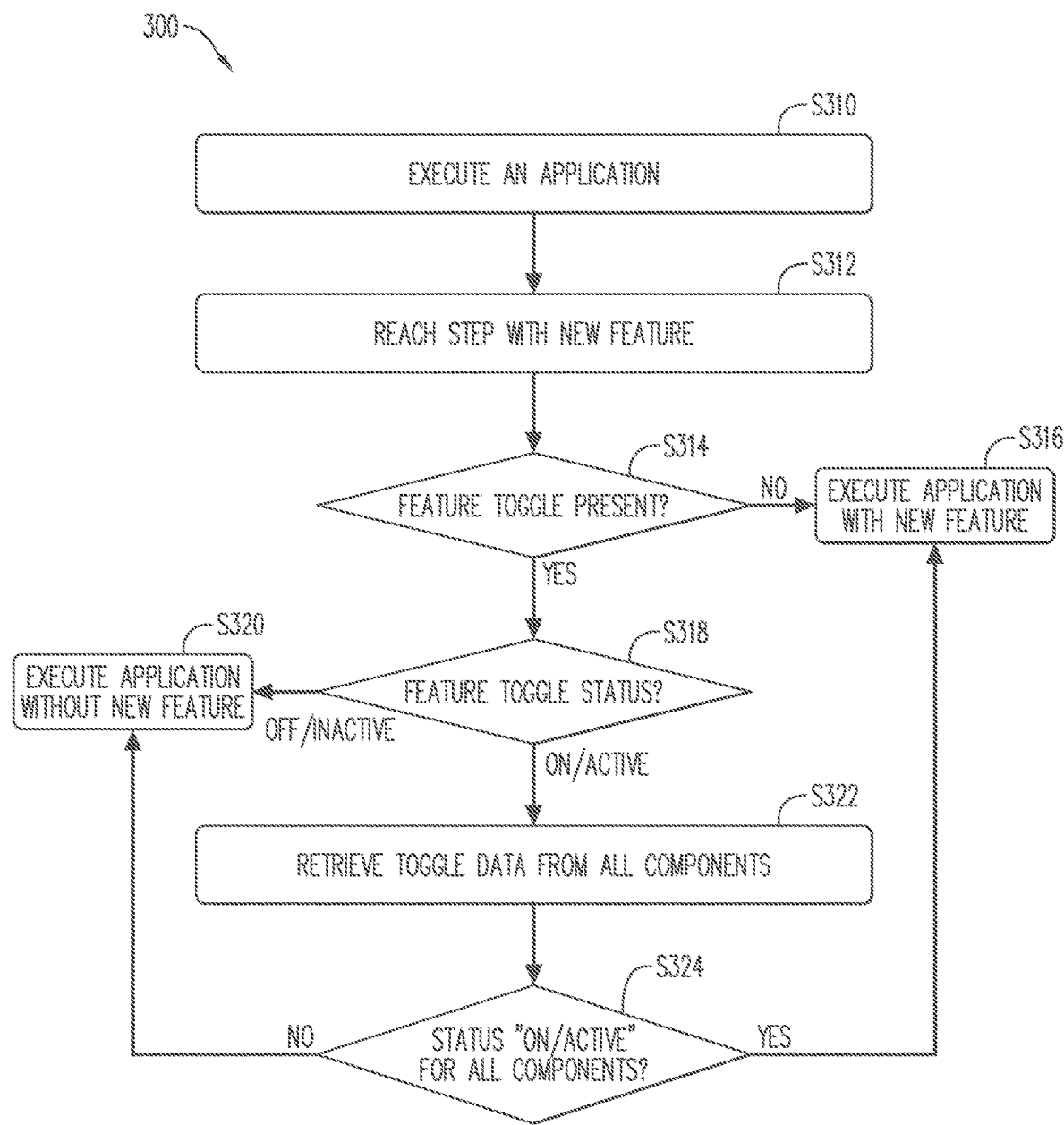
FIG. 3 is a flow diagram according to some embodiments.
Figure 4:
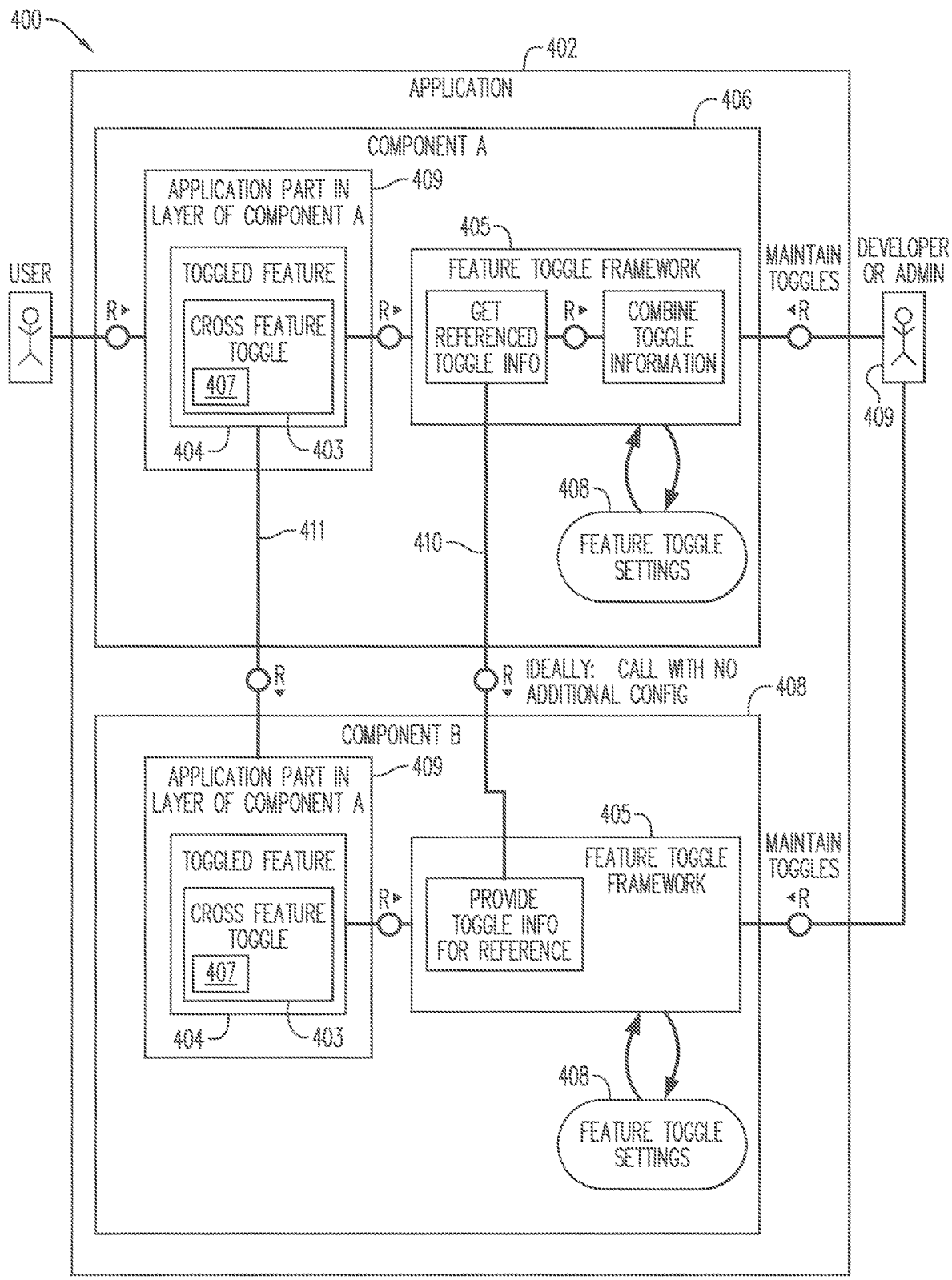
FIG. 4 is a block diagram of a system architecture according to some embodiments.

FIGS. 3-4 include a flow diagram of process 300 (FIG. 3) for introducing a new feature/functionality to multiple components using a cross-feature toggle and a system architecture 400 (FIG. 4) for executing the process 300, according to some embodiments. Process 300 may be executed by the software architecture 600 according to some embodiments. In one or more embodiments, the software architecture 600 may be conditioned to perform the process 300, such that a processor 610 (FIG. 6) of the system 600 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Prior to starting the process 300 described below, associated components of an application may align the parameters they use that allow a given component to determine which components are participating components in the cross-feature toggle and whether these participating components are ready to implement the new feature/functionality. The associated components include a leading component and one or more participating components. The leading component and one or more participating components may be linked together and referred to as "associated components" when the components are in different layers and may be dependent on each other to operate with a given new feature/functionality. Non-exhaustive examples of these parameters may be identifiers which may be assigned to the component, name equality (i.e., the feature name used by associated components is the same), or a mapping of components via a common parameter. In embodiments, no additional configuration for calling from a first component to a second component is needed on top of what is provided for the usual functionality of the components. As a non-exhaustive example, a programming language and a kernel may interact directly by kernel calls. The programming language may hence call into the kernel with a defined interface to pass and receive information.

Turning to FIG. 3, the process 300 begins at S310 with the execution of a software application 402 ("application") by a user 404. The application 402 may include a new feature/functionality 404 ("toggled feature") for an application part in a layer of the given Component A/B 409, cross-feature toggle 403, a feature toggle framework 405 and feature toggle settings 408 (e.g., "ON/ACTIVE" or "OFF/INACTIVE"). The execution of the application 402 may occur on multiple components, such as a first component 406, shown in FIG. 4 as "Component A" and a second component 408, shown in FIG. 4 as "Component B". The first component 406 may be referred to as a "leading component" or "leading cross-feature toggle" and may be the component that is closest to an interaction with the user 404 (i.e., the component where a call stack starts). The leading cross-feature toggle may trigger the question of whether the other participating components are ready to execute the new feature/functionality. The second component 408 and any other components may be referred to as "participating feature toggles" or "participating component". As described further below, the participant feature toggles may know which component is the leading cross-feature toggle and may only execute the logic within their toggle when they receive a notification that the leading cross-feature toggle is "ON/ACTIVE." As a non-exhaustive example, suppose Component B has finished its feature development. The new feature may be used from Component B's perspective. For Component, B, the toggle may be set to "ON/ACTIVE,". However, in this example, Component A may not be ready with the feature, and as such, the toggle stays on "OFF/INACTIVE". The logic is: A is off/inactive. The information says that Component B is participating in the cross-feature toggles. B is—in the component B itself—set to active, but the overall functionality is determined ON or OFF by a combination of all parts. Consequently, the overall feature across all participating components is considered OFF, as at least one component is "OFF/INACTIVE". In Component B, the logic may be, at the point where the decision is taken whether or not to execute the new feature's logic, to have a decision of "execute old logic as not all parts of the application are ready yet." It is noted that there may be multiple participating feature toggles that are linked to a single leading cross-feature toggle. A new feature is only executed if the leading and all participating feature toggles are "ON/ACTIVE".

Next, at S312, the executing application 402 may determine a new feature/functionality is present when it reaches the step with the new feature/functionality 404. A cross-feature toggle module 502 (FIG. 5) then determines at S314 whether a cross-feature toggle 403 is present. In some embodiments the determination of whether the cross-feature toggle 403 is present is based on an IF statement (or a similar type of statement). In a case such a statement is checking the status of a feature toggle, the feature toggle is present. As a non-exhaustive example, the coding may contain a statement such as "IF <feature toggle is active across all participating layers> EQUALS TURE", then this is the entry point to the new feature, controlled by the toggle. It is noted that a call of the feature toggle in the case of a cross-feature toggle may mean calling a method, where "<feature toggle is active across all participating layers>" may mean to start an internal logic implemented by the toggle framework. In one or more embodiments, the toggle framework may know all configuration data about the toggles. The method may return "true" or "false" and may internally execute the logic with an evaluation of all participating feature toggles, as described above. As a result, all participating components may have access to the overall information about "feature is available in all participating layers or not" and may act accordingly.

In a case the cross-feature toggle 403 is not present, the process proceeds to S316, and the application continues executing using the new feature/functionality. In a case it is determined at S314 that the cross-feature toggle 403 is present, the process 300 continues to S318 to determine whether the cross-feature toggle 403 has an "ON/ACTIVE" status or an "OFF/INACTIVE" status per the settings 408. The cross-feature toggle 403 may include a parameter or setting that indicates that the feature is dependent on a feature toggle in at least one other component (e.g., the toggle depends on toggles from other components). When the application is executed, the new feature will only be executed in a case the cross-feature toggle 403 is activated ("ON/ACTIVE") in all components. In a case it is determined at S318 that the feature toggle has an "OFF/INACTIVE" status, the process 300 proceeds to S320 and the application continues execution without using the new feature/functionality 304. In some embodiments, a log entry may be entered that a component has been operated with the new feature/functionality or the old feature/functionality. It is noted that the component may have more than one functionality, and it may be desirable to have those functionalities continue to execute, even when the new feature/functionality is not yet available.

In a case it is determined at S318 that the cross-feature toggle 403 has an "ON/ACTIVE" status, the process 300 proceeds to S322 and the cross-feature toggle module 502 retrieves toggle data from all of the associated components. In one or more embodiments, the toggle data is retrieved by the leading component 406 ("Component A") sending, via the feature toggle framework, a status call to each participating component 408 ("Component B"), and the feature toggle framework of the participating component 408 returning a response indicating either "cross-feature toggle in component is "ON/ACTIVE"" or "cross-feature toggle in component is "OFF/INACTIVE"". In one or more embodiments, the status call may be sent as a message directed to the participating components based on routes that are specified as a message header or via any other suitable specification. In some embodiments, there may be an interface, for example, an Application Programming Interface (API), to call the different components with the messages. The message may be received by the API. Then a processor in the component may convert the message received from the API to a format of the feature toggle framework to be processed thereby. The returned status may be transmitted along an additional route and converted in a similar manner. The returned status data may be sent as a message. In one or more embodiments, the returned responses may be stored in a toggle table 541 or any other suitable storage. The toggle table 541 may store all the feature/cross-feature toggles and the current state of each feature/cross-feature toggle in a centralized location. The format of this table may be arbitrary and may expand to fit additional data fields required for its application. In some embodiments, during deployment, the returned responses may be stored in a memory (e.g., RAM) for the user session such that the status may be more easily accessed and made available for that session, as described further below. As described above, when the developer 409 implements the cross-feature toggle 403 on the leading component 406, the developer 409 may include at the cross-feature toggle 403 an identifier 407 for each of the other participating components 408. Non-exhaustive examples of the identifier 407 may be an identifier by name, by a unique ID, or any other adequate identification attribute. Based on the retrieved toggle data for the leading component 406 and each component 406, 408 from the toggle table 541 (or memory), the cross-feature toggle module 502 may determine whether the status for each participating component 408 is "ON/ACTIVE" or "OFF/INACTIVE" at S324. In a case the cross-feature toggle module 502 determines at S324 that less than all of the components 406, 408 have a status of "ON/ACTIVE", the process 300 proceeds to S320 and the application continues execution without using the new feature/functionality 304. In a case the cross-feature toggle module 502 determines at S324 that all of the components 406, 408 have a status of "ON/ACTIVE", the process proceeds to S316, and the application continues executing using the new feature/functionality in all of the components 406, 408.

In one or more embodiments, even though the new feature/functionalities for two or more components are developed independently, the new feature/functionalities for one component may be linked to the other associated components as described above, so that the appropriate features are executed at the appropriate time. This linking may be via name equality, a mapping, or other suitable link. With respect to name equality, the leading component may have a feature named "ActivateSocialSecurityNumber" and when sending the data to the participating component, the leading component indicates that it has a configuration switch "ActivateSocialSecurityNumber" as "ON/ACTIVE". The participating component may also have the new feature named "ActivateSocialSecurityNumber", such that the different components may request/return data based on a same name. With respect to mapping, the component may call into a separate system that includes data that maps the new feature/functionality to each associated component. For any of the components where the software application is executed, use of the cross-feature toggle 403 may make it is safe to activate the feature toggle 404. The reason for this is that no errors will occur in a case that the other components do not have the cross-feature toggle yet or have the cross-feature toggle 403 in an "OFF/INACTIVE" state, as the cross-feature toggle module 502 may only implement the new feature/functionality for any of the components when all of the components have an "ON/ACTIVE" status. The situation of a component not having the cross-feature toggle yet may occur when the given component is developed in a different system (e.g., the software application receives regular data transports from this system), and the toggle has not been installed yet. In the case the cross-feature toggle is absent, the response at S318/S322 may be an indication that the status is "OFF/INACTIVE", as in the case when the cross-feature toggle is present, but the new feature/functionality is not yet available (and the response is an indication that the status is "OFF/INACTIVE"). The use of the cross-feature toggle 403 may allow for asynchronous development cycles for the different components and may avoid test breakage or disruption of other developers' work while waiting for all of the components to be available with an active cross-feature toggle.

As a non-exhaustive example of the process 300, suppose a new field is being developed for display on a user interface to receive information from a user. The user interface is controlled by the first component 406. There is also data that is stored in a database table and the database table is controlled by the second component 408. In operation, the first component 406 may call the second component 408 with the data received in the UI, and then the second component 408 may write the data in the database. To write the data into the database, the second component 408 needs to have a new field in which to write this data. The second component 408 may be responsible for extending the database to create the new field. In this example, the user may execute the application (S310) via double clicking an icon, for example. It may be desirable, before the user interface is displayed, for the first component 406 to query the second component 408 to determine whether the new field has been created. In a case the new field has not been created in the database, the first component 406 may not display the field on the user interface. The reason for this is that while the first component can show the field to the user on the UI, the second component is not ready to process the data. Not displaying the field to the user until both components are ready may avoid a situation where the user interface of the first component 406 displays the field, receives the input, and calls the second component 408 to write the data, but the second component 408 does not yet have the field and so there is no place to write the received data. As the application is loading/launching/starting, the application set-up reaches the step with the new feature (S312). The cross-feature toggle module 502 determines whether the first component 406 has a cross-feature toggle 403 present (S314). In the case the cross-feature toggle 403 is present, the cross-feature toggle module 502 determines the cross-feature toggle status is ON/ACTIVE (S318/S322), meaning the new feature/functionality at the first component 406 is ready. In this example, the first component 406 has a UI that is ready with a new field to receive data. The cross-feature toggle module 502 may then retrieve toggle data from all other participating components associated with the first component based on the identifier 407 of those other participating components (S322) in the cross-feature toggle 403. In this example, the first component 406 sends a status call 410 to the second component 408. In one or more embodiments, the call may be from the feature toggle framework of the first component to the feature toggle framework of the second component. When the database of the second component has been extended (e.g., by the developer) to include the new field, the status may be "ON/ACTIVE". It is noted that in some instances, the developer may switch a status to "ON/ACTIVE" or another person may switch the status, such that the entity that expands the database in this example may be different from the entity altering the status. The second component 408 returns a response indicating that the status is "ON/ACTIVE" meaning the database is extended and the second component 408 may write data into the new field. Then the application is executed with the new feature (S316), whereby the UI calls 411 the database layer where the database information would be retrieved, and displays the new user-entry field. Similarly, data received in this field is written 411 to the database. It is noted that while the examples herein describe the UI layers being ready to use the new feature/functionality before the lower layers, there may be instances where the lower layers are ready first.

It is noted that a software application may try to minimize calls from one component to another to improve the overall performance of the application and the user experience. To minimize calls, in one or more embodiments, for a given user session (which may be defined as the overall time the user spends with the application to complete a given task such as maintaining master data (maybe even repeatedly, such as e.g. entering a list of new business partners), or completing an order of goods, or displaying a summary of paid taxes, performing an analysis, or in general interacting with the system for as long as the overall task takes) the components may have a memory element to store the toggle information about the status being "ON/ACTIVE" or "OFF/INACTIVE" within each participating component, so that this information is available during the user session. By storing the information that all of the components are ready, the system 400 does not have to execute the process 300 every time the logic passes the place where the feature toggle is present. As a non-exhaustive example, consider the user is maintaining business partner data. A new field has been introduced for this maintenance (e.g., social security number SSN)). Now the user needs to enter twenty new business partners. To start with for the first business partner, the UI determines whether the SSN needs to be displayed. The logic runs and determines "Yes, SSN is available in all participating components." As a result, the SSN is displayed and may also be processed in the database layer. The user may enter all the data, including SSN, this "SAVE" and is brought back to the overview screen. From here, the user may choose the action "Enter new business partner" again to enter a second business partner. As these processes are all running within the same user sessions (the user performing the action without disruption or closing the application), the feature toggle may know that its overall status will be "ON/ACTIVE" and there is no need to make further determination. As another example, a same user may work on an application for a long time. Storing the on/active or off/inactive information in each component may streamline the user experience by reducing waiting time to a minimum, as each component does not have to spend time for checks each time. As a non-exhaustive example, after the developer makes sure the feature toggle logic is present and may be executed to deliver this overall information, the developer releases the development. Now the user executes the application. The whole toggle logic is needed at the beginning of the user's work to determine whether the user gets to see the new feature. However, this determination may take some time, and if the user has a repeated task (e.g., entering 20 new social security numbers, as described above), the user will conventionally have to wait repeatedly. To resolve this, embodiments provide for the cross-feature toggle module 502 to save this information, such that the determination is executed only once at the beginning of the user's work and the executing application 402 will store the information while the user works. As a non-exhaustive example in a production environment, and keeping with the new field example described above, after the determination that all the components are ready, the user may enter data into the field and selects "enter" or "save" to complete the action. The first component then sends the information to the second component which thus already knows that its status is "ON/ACTIVE". The second component may save the data into the database without executing process 300 again to determine whether the new feature/functionality is available in all the components. In a case the user entered wrong information (e.g., the user entered a social security number, but the field is set to receive a last name), the system may report the error to the user, and the user may need to enter the correct data. By saving the toggle status, the process 300 does not need to be repeated for the entry of the correct data.

Figure 5:
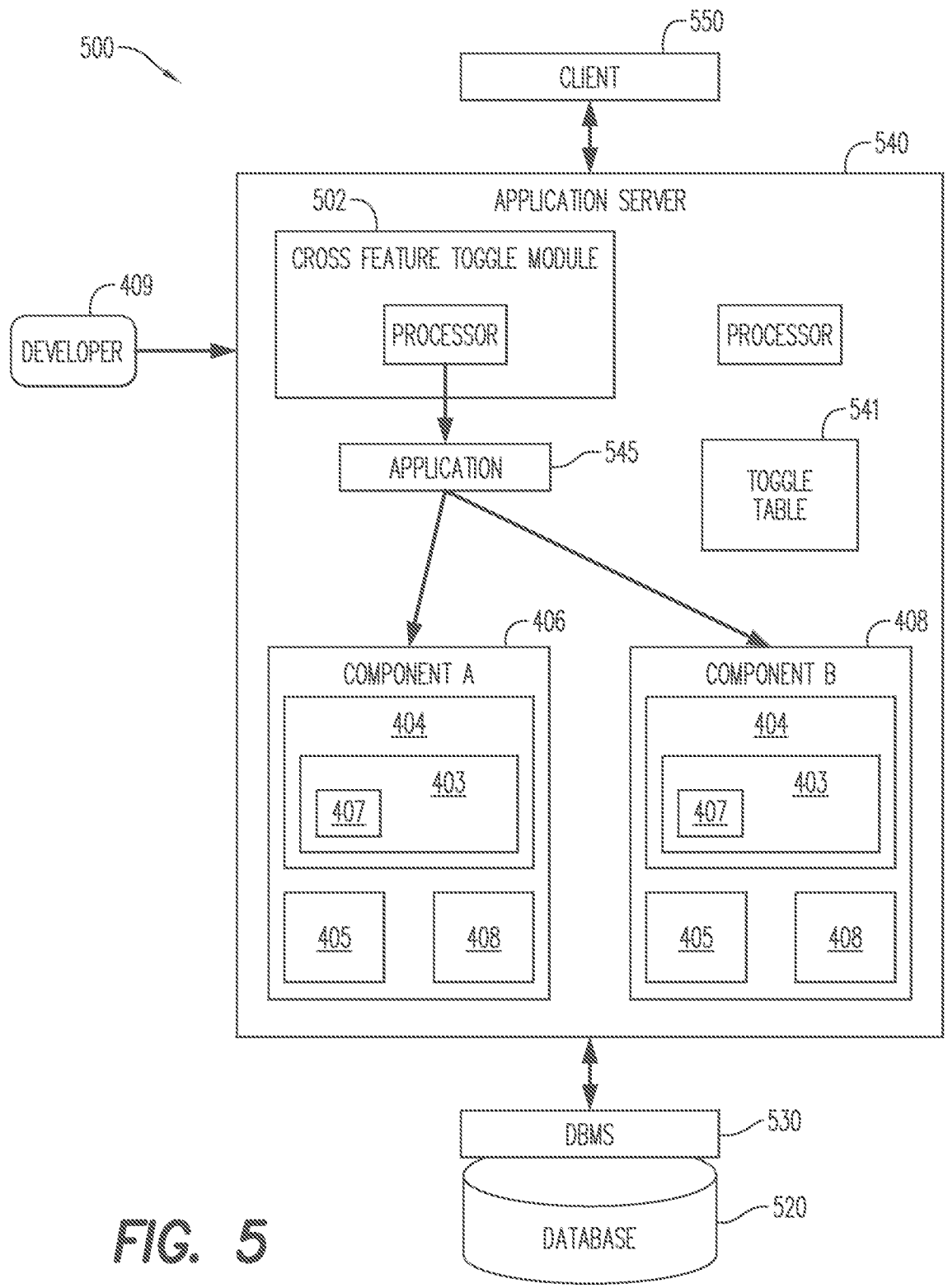
FIG. 5 is a block diagram of a system architecture according to some embodiments.

FIG. 5 is a block diagram of system architecture 500 according to some embodiments. Embodiments are not limited to architecture 500 or to a three-tier storage architecture. One or more components of the system architecture 500 may be located remote from one another and one or more components may be allocated in a cloud-computing environment. Such a cloud computing environment may elastically allocate and de-allocate compute (e.g., virtual machines) and storage (e.g., file-based, block-based, object-based) resources depending on demand, cost and/or other factors.

Architecture 500 includes a cross-feature toggle module 502, a database 520, a database management system (DBMS) 530, an application server 540, application(s) 545, and clients 550. Applications 545 may comprise server-side executable program code (e.g., compiled code, scripts, etc.) executing within application server 540 to receive queries/requests from clients 550 and provide results to clients 550 based on data of database 520 and the output of the cross-feature toggle module 502. The cross-feature toggle module 502 executing within application server 540, may be accessed to determine the functionality is available for use in the execution of the application 545.

Application server 540 provides any suitable interfaces through which the clients 550 may communicate with the cross-feature toggle module 502 or applications 545 executing on application server 540. For example, application server 540 may include a HyperText Transfer Protocol (HTTP) interface supporting a transient request/response protocol over Transmission Control Protocol/Internet Protocol (TCP/IP), a Web Socket interface supporting non-transient full-duplex communications which implement the Web Socket protocol over a single TCP/IP connection, and/or an Open Data Protocol (OData) interface.

One or more applications 545 executing on server 540 may communicate with DBMS 530 using database management interfaces such as, but not limited to, Open Database Connectivity (ODBC) and Java Database Connectivity (JDBC) interfaces. These types of applications 545 may use Structured Query Language (SQL) to manage and query data stored in database 520.

DBMS 530 serves requests to retrieve and/or modify data of database 520, and also performs administrative and management functions. Such functions may include snapshot and backup management, indexing, optimization, garbage collection, and/or any other database functions that are or become known. DBMS 530 may also provide application logic, such as database procedures and/or calculations, according to some embodiments. This application logic may comprise scripts, functional libraries and/or compiled program code. DBMS 530 may comprise any query-responsive database system that is or becomes known, including but not limited to a structured-query language (i.e., SQL) relational database management system.

Application server 540 may be separated from, or closely integrated with, DBMS 530. A closely-integrated application server 540 may enable execution of server applications 545 completely on the database platform, without the need for an additional application server. For example, according to some embodiments, application server 540 provides a comprehensive set of embedded services which provide end-to-end support for Web-based applications. The services may include a lightweight web server, configurable support for OData, server-side JavaScript execution and access to SQL and SQLScript.

Application server 540 may provide application services (e.g., via functional libraries) which applications 545 may use to manage and query the data of database 520. The application services can be used to expose the database data model, with its tables, hierarchies, views and database procedures, to clients. In addition to exposing the data model, application server 540 may host system services such as a search service.

Database 520 may store data used by at least one of: applications 545 and the cross-feature toggle module 502. For example, database 520 may store one or more tables/maps accessed by the cross-feature toggle module 502 to link the components during execution thereof.

Generally, the system architecture 500 manages data of a database instance which is persisted in the database 520. The database 520 may be stored on-premise or on a cloud platform. Embodiments may utilize more than one database. Database 520 may comprise any query-responsive data source or sources that are or become known, including but not limited to a structured-query language (SQL) relational database management system. Database 520 may comprise a relational database, a multi-dimensional database, an extensible Markup Language (XML) document, or any other data storage system storing structured and/or unstructured data. The data of database 520 may be distributed among several relational databases, dimensional databases, and/or other data sources. Embodiments are not limited to any number or types of data sources.

In some embodiments, the data of database 520 may comprise one or more of conventional tabular data, row-based data, column-based data, and object-based data. Moreover, the data may be indexed and/or selectively replicated in an index to allow fast searching and retrieval thereof. Database 520 may support multi-tenancy to separately support multiple unrelated clients by providing multiple logical database systems which are programmatically isolated from one another.

Database 520 may implement an "in-memory" database, in which a full database is stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Client 550 may comprise one or more individuals or devices executing program code of a software application for presenting and/or generating user interfaces to allow interaction with application server 540. Presentation of a user interface as described herein may comprise any degree or type of rendering, depending on the type of user interface code generated by application server 540.

For example, a client 550 may execute a Web Browser to request and receive a Web page (e.g., in HTML format) from a website application 545 of application server 540 to provide the UI 400/700 via HTTP, HTTPS, and/or Web Socket, and may render and present the Web page according to known protocols. The client 550 may also or alternatively present user interfaces by executing a standalone executable file (e.g., an .exe file) or code (e.g., a JAVA applet) within a virtual machine.

Figure 6:
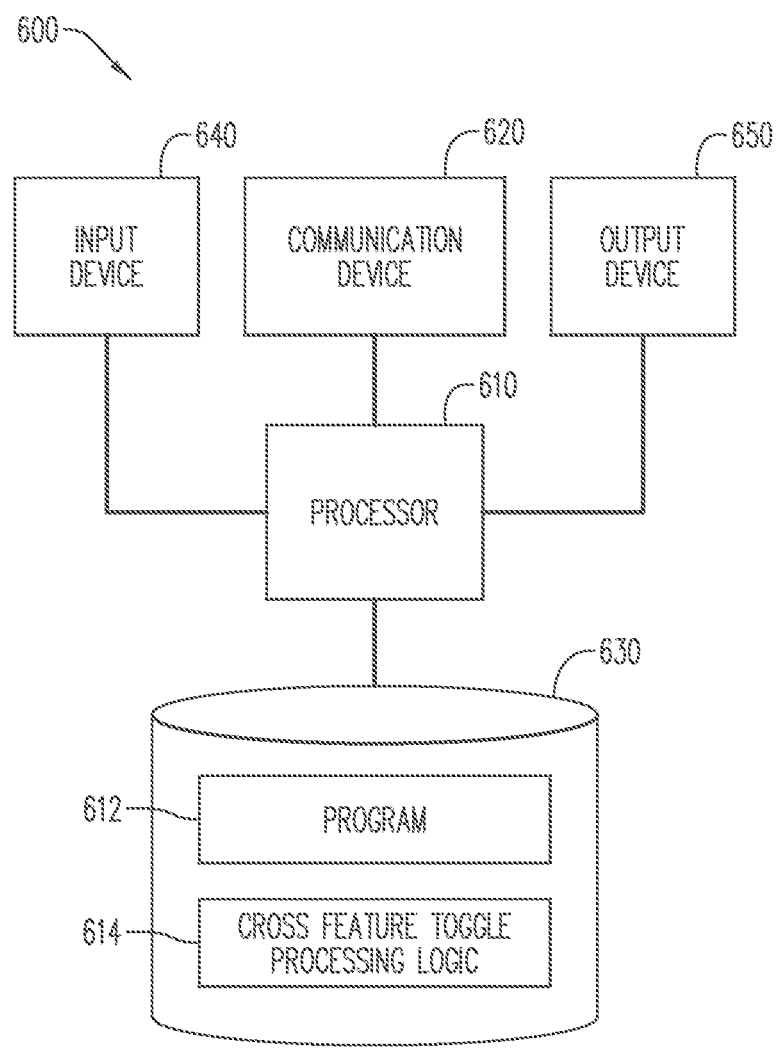
FIG. 6 is a block diagram of a system according to some embodiments.

FIG. 6 is a block diagram of apparatus 600 according to some embodiments. Apparatus 600 may comprise a general- or special-purpose computing apparatus and may execute program code to perform any of the functions described herein. Apparatus 600 may comprise an implementation of one or more elements of system 500. Apparatus 600 may include other unshown elements according to some embodiments.

Apparatus 600 includes a cross-feature toggle processor 610 operatively coupled to communication device 620, data storage device/memory 630, one or more input devices 640, and one or more output devices 650. Communication device 620 may facilitate communication with external devices. Input device(s) 640 may comprise, for example, a keyboard, a keypad, a mouse or other pointing device, a microphone, knob or a switch, an infra-red (IR) port, a docking station, and/or a touch screen. Input device(s) 640 may be used, for example, to manipulate graphical user interfaces and to input information into apparatus 600. Output device(s) 650 may comprise, for example, a display (e.g., a display screen) a speaker, and/or a printer.

Data storage device/memory 630 may comprise any device, including combinations of magnetic storage devices (e.g., magnetic tape, hard disk drives and flash memory), optical storage devices, Read Only Memory (ROM) devices, Random Access Memory (RAM) etc.

The storage device 630 stores a program 612 and/or cross-feature toggle logic 614 for controlling the processor 610. It is noted that program 612 and/or cross-feature toggle logic 614 may also be stored and executed from an application server or from any other environment (e.g., software architecture) that can execute software instructions. The processor 610 performs instructions of the programs 612, 614, and thereby operates in accordance with any of the embodiments described herein, including but not limited to process as 300. The executable instructions of the programs 612, 614 represent the executable instructions of the software architecture, including implementation of the methods, modules, subsystems and components and so forth described herein and may also include memory and/or storage modules, etc.

The programs 612, 614 may be stored in a compressed, uncompiled and/or encrypted format. The programs 612, 614 may furthermore include other program elements, such as an operating system, a database management system, and/or device drivers used by the processor 810 to interface with peripheral devices.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of computing devices in communication with one another via any number of other public and/or private networks. Two or more of such computing devices may be located remotely from one another and may communicate with one another via any known manner of network(s) and/or a dedicated connection. Each computing device may comprise any number of hardware and/or software elements suitable to provide the functions described herein as well as any other functions. For example, any computing device used in an implementation of system 600 may include a processor to execute program code such that the computing device operates as described herein.

All systems and processes discussed herein may be embodied in program code stored on one or more computer-readable non-transitory media. Such non-transitory media may include, for example, a fixed disk, a floppy disk, a CD-ROM, a DVD-ROM, a Flash drive, magnetic tape, and solid-state RAM or ROM storage units. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A system comprising:
   two or more components;
   a cross-feature toggle module;
   a cross-feature toggle processor in communication with the cross-feature toggle module and operative to execute processor-executable process steps to cause the system to:
   receive a request to execute an application;
   determine a new feature element is present;
   determine a cross-feature toggle is present, wherein the feature toggle includes an active state and an inactive state;
   determine whether the cross-feature toggle is in an active state for each of a respective two or more components;
   in a case the cross-feature toggle is in the active state for each of the two or more components, execute the application with the new feature element; and
   in a case the cross-feature toggle is in the active state for less than all of the two or more components, execute the application without the new feature element.

2. The system of claim 1, wherein the cross-feature toggle active state indicates the new feature element is executable.

3. The system of claim 1, wherein the new feature element is a new function of the application.

4. The system of claim 1, further comprising process steps to:
   in a case the cross-feature toggle is present and inactive, execute the application without the new feature element.

5. The system of claim 1, wherein each cross-feature toggle includes an identification of at least one other component operable to utilize the new feature element.

6. The system of claim 1, wherein determining whether the cross-feature toggle is in an active state for each of a respective two or more components, further comprises steps to cause the system to:
   send a status request from a first component to a second component for a cross-feature toggle status of the second component; and
   return the cross-feature toggle status of the second component.

7. The system of claim 1, wherein each component has an independent development cycle from each other component.

8. The system of claim 1, wherein a first component is dependent on a functionality of a second component.

9. The system of claim 8, wherein the first component and the second component transfer data therebetween.

10. The system of claim 1, wherein a first component is the component where a call stack starts; and the first component is a leading component.

11. The system of claim 10, wherein the other components are participating components.

12. The system of claim 11, wherein the cross-feature toggle module determines whether the cross-feature toggle for each of the participating components is in the active state.

13. The system of claim 11, wherein the cross-feature toggle for each component is adapted to save an instruction to execute the application with the new feature element in a case the cross-feature toggle is in the active state for each of the two or more components.

14. A computer-implemented method comprising:
   receiving a request to execute an application;
   determining a new feature element is present;
   determining whether a cross-feature toggle is present, wherein the feature toggle includes an active state and an inactive state;
   in a case the at least one cross-feature toggle is present, determining whether the cross-feature toggle is in an active state for each of a respective two or more components;
   in a case the cross-feature toggle is in the active state for each of the two or more components, executing the application with the new feature element; and
   in a case the cross-feature toggle is in the active state for less than all of the two or more components, executing the application without the new feature element.

15. The computer-implemented method of claim 14, wherein the cross-feature toggle active state indicates the new feature element is executable.

16. The computer-implemented method of claim 14, wherein the new feature element is a new function of the application.

17. The computer-implemented method of claim 14, further comprising:
   in a case the cross-feature toggle is present and inactive, executing the application without the new feature element.

18. The computer implemented method of claim 1, wherein each cross-feature toggle includes an identification of at least one other component operable to utilize the new feature element.

19. A non-transitory computer-readable medium storing program instructions executed by a processor of a computer system having a memory, the medium comprising instructions for causing the processor to perform:
   receiving a request to execute an application;
   determining a new feature element is present;
   determining whether a cross-feature toggle is present, wherein the feature toggle includes an active state and an inactive state;
   in a case the at least one cross-feature toggle is present, determining whether the cross-feature toggle is in an active state for each of a respective two or more components;
   in a case the cross-feature toggle is in the active state for each of the two or more components, executing the application with the new feature element; and
   in a case the cross-feature toggle is in the active state for less than all of the two or more components, executing the application without the new feature element.

20. The medium of claim 19, further comprising instructions for causing the processor to perform:
   in a case the cross-feature toggle is present and inactive, executing the application without the new feature element.

* * * * *